United States Patent
Sherman

(10) Patent No.: US 9,174,237 B2
(45) Date of Patent: Nov. 3, 2015

(54) PRESSURE SENSITIVE ADHESIVE ARTICLE

(71) Applicant: 3M INNOVATIVE PROPERTIES COMPANY, St. Paul, MN (US)

(72) Inventor: Audrey A. Sherman, St. Paul, MN (US)

(73) Assignee: 3M Innovative Properties, Co., St. Paul, MN (US)

( * ) Notice: Subject to any disclaimer, the term of this patent is extended or adjusted under 35 U.S.C. 154(b) by 0 days.

(21) Appl. No.: 13/955,131

(22) Filed: Jul. 31, 2013

(65) Prior Publication Data

US 2013/0316076 A1    Nov. 28, 2013

Related U.S. Application Data

(63) Continuation of application No. 11/926,401, filed on Oct. 29, 2007, now abandoned.

(51) Int. Cl.
| | |
|---|---|
| *B05D 5/10* | (2006.01) |
| *B05D 1/34* | (2006.01) |
| *C09J 7/02* | (2006.01) |
| *C09J 7/00* | (2006.01) |
| *C09J 143/04* | (2006.01) |

(52) U.S. Cl.
CPC ... *B05D 1/34* (2013.01); *C09J 7/00* (2013.01); *C09J 7/0207* (2013.01); *C09J 143/04* (2013.01); *C09J 2201/134* (2013.01); *C09J 2201/36* (2013.01); *C09J 2203/306* (2013.01); *C09J 2433/00* (2013.01); *C09J 2483/00* (2013.01); *Y10T 428/1476* (2015.01); *Y10T 428/269* (2015.01)

(58) Field of Classification Search
CPC ...... B05D 1/34; C09J 2201/36; C09J 7/0207; C09J 134/04
USPC ............................................ 427/208.4, 208.8
See application file for complete search history.

(56) References Cited

U.S. PATENT DOCUMENTS

| | | | |
|---|---|---|---|
| 3,554,835 A | 1/1971 | Morgan | |
| 4,693,935 A * | 9/1987 | Mazurek | 428/352 |
| 4,894,259 A | 1/1990 | Kuller | |
| 5,837,324 A * | 11/1998 | Yapel et al. | 427/402 |
| 6,187,432 B1 | 2/2001 | Krish | |
| 6,197,379 B1 | 3/2001 | Minamino | |
| 6,503,564 B1 | 1/2003 | Fleming et al. | |
| 6,503,620 B1 * | 1/2003 | Xie et al. | 428/354 |
| 6,740,379 B1 | 5/2004 | Congard | |
| 2002/0192463 A1* | 12/2002 | Kiuchi et al. | 428/343 |
| 2003/0129343 A1* | 7/2003 | Galkiewicz et al. | 428/40.1 |
| 2004/0058603 A1 | 3/2004 | Hayes | |
| 2005/0123705 A1 | 6/2005 | Dronzek | |

(Continued)

FOREIGN PATENT DOCUMENTS

| | | |
|---|---|---|
| GB | 1 541 311 | 4/1976 |
| JP | 2001-294828 | 10/2001 |

*Primary Examiner* — Xiao Zhao
(74) *Attorney, Agent, or Firm* — Jeffrey M. Olofson

(57) ABSTRACT

Disclosed herein is an article including a substrate, a first layer adjacent the substrate, the first layer having a silicone-containing pressure sensitive adhesive and a thickness of less than about 5 um, and a second layer adjacent the first layer and opposite the substrate, the second layer having a pressure sensitive adhesive. The silicone-containing pressure sensitive adhesive can include a copolymer of a vinyl polymeric backbone having polysiloxane moieties grafted thereto.

11 Claims, 1 Drawing Sheet

(56) References Cited

U.S. PATENT DOCUMENTS

| | | |
|---|---|---|
| 2005/0154166 A1 | 7/2005 | Husemann |
| 2006/0057367 A1 | 3/2006 | Sherman et al. |
| 2006/0093775 A1 | 5/2006 | Konig |
| 2007/0110941 A1 | 5/2007 | Utesch |
| 2007/0160764 A1* | 7/2007 | Aydin et al. .................. 427/355 |
| 2007/0213463 A1 | 9/2007 | Sherman et al. |
| 2008/0141004 A1 | 6/2008 | Kershaw |
| 2008/0280086 A1 | 11/2008 | Sheridan |

* cited by examiner

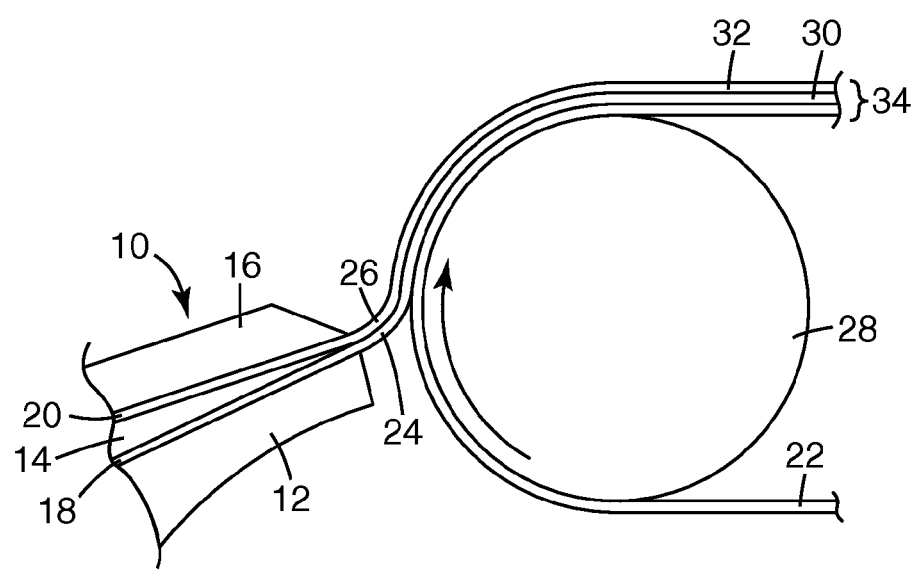

PRESSURE SENSITIVE ADHESIVE ARTICLE

RELATED PATENT DOCUMENTS

This application is a continuation of U.S. Ser. No. 11/926,401, filed Oct. 29, 2007

BACKGROUND

This disclosure relates to pressure sensitive adhesive (PSA) articles, particularly those having a thin layer of a silicone-containing PSA between a layer of a conventional PSA and a substrate. Also described is a multilayer coating method in which two or more layers of fluids are coated on a substrate and to articles made using the method.

A fundamental characteristic of a coating process is the number of layers that can be applied per applicator. Single layer coating processes employ applicators that can apply one coating layer at a time, that is, a single coating layer is applied per pass of a web past the applicator. Multilayer coating processes employ applicators that can apply two or more coating layers at a time and are typically premetered processes in that all of the fluid fed to the applicator is applied to the web. Examples of multilayer coating processes include slot, extrusion, slide, and curtain coating processes.

Today, there is much need for high performance coated articles manufactured by coating two or more layers of fluid onto a continuous web. The fluids can be coated using a single layer coating process such that the fluids are coated in series with each layer being dried, cured, etc. before the next one is applied. For reasons such as efficiency and cost, it is usually more desirable to employ multilayer coating processes in which the fluids are coated simultaneously onto the web.

Applicators used in multilayer coating processes can be designed to deliver a wide range of fluids, but this is typically not the case if the fluids are to be coated simultaneously. That is, for a given set of fluids to be coated simultaneously, the particular applicator and process conditions used in a multilayer coating process often dictate how different the fluids can be with respect to a particular property such as surface tension, viscosity, etc. Thus, there is a need for multilayer coating processes that are amenable to coating simultaneously fluids having properties that are very different from each other. There is also a need for multilayer coating processes that employ conventional multilayer coating applicators and are amenable to coating simultaneously fluids having properties that are very different from each other.

SUMMARY

In one aspect, disclosed herein is a multilayer coating method that can be used to coat simultaneously fluids onto a substrate. The multilayer coating method includes: providing a first coating fluid comprising a first pressure sensitive adhesive; providing a second coating fluid comprising a second pressure sensitive adhesive, the second coating fluid having a surface tension that is greater than that of the first; moving a substrate along a path through a coating station; flowing the second coating fluid at a rate sufficient to form a continuous flowing layer to the substrate; flowing the first coating fluid onto the continuous flowing layer thereby forming a composite flowing layer; contacting the substrate with the composite flowing layer such that the first coating fluid is interposed between the continuous flowing layer and the substrate; and forming the continuous flowing layer into a film after the composite flowing layer contacts the substrate.

In another aspect, the method can be used to make an article comprising two layers of pressure sensitive adhesive: a first layer adjacent the substrate and comprising a first pressure sensitive adhesive that contains silicone, and a second layer adjacent the first layer and opposite the substrate, the second layer comprising a second pressure sensitive adhesive. The first pressure sensitive adhesive may comprise a copolymer having a vinyl polymeric backbone with polysiloxane moieties grafted thereto. The first layer may have a thickness of less than about 25 um. The substrate may comprise a release liner such as a microstructured release liner having a microstructured surface that is adjacent the first layer. Optionally, a backing may be laminated to the second layer. When a backing is used, the substrate may be removed to form an article with an exposed first layer. This article can then be adhered to an object and temporarily repositioned until desired placement is achieved. The article may be used as a protective film, a decorative film, a graphic art film, a privacy film, or a paint replacement film, to name but a few.

These and other aspects of the invention will be apparent from the drawing and detailed description below. In no event, however, should the above summary be construed as a limitation on the claimed subject matter, which subject matter is defined solely by the claims, as set forth herein.

BRIEF DESCRIPTION OF THE DRAWING

The FIGURE shows a schematic of an exemplary multilayer coating method.

DETAILED DESCRIPTION

Surface tension and surface energy are two important properties in coating operations. For a single layer of fluid being coated on a substrate, proper wetting of the fluid on the substrate occurs if the surface tension of the fluid is lower than the surface energy of the substrate. If this is not the case, the forces exerted along the surface of the fluid would likely cause it to "bead up" and form into drops. Likewise, in a typical multilayer coating operation in which two different fluids are simultaneously coated on a substrate, such as in the schematic described in the FIGURE, it is generally accepted that the fluid used to form the upper layer must have a lower surface tension as compared to that of the fluid used to form the lower layer. Otherwise, the fluid used to form the upper layer would not be able to wet the layer formed underneath it. Further discussion of the relationships for surface tension and surface energy with respect to multilayer coating operations can be found in Cohen, E. and Gutoff, E. Modern Coating and Drying Technology; VCH Publishers: New York, 1992; p. 122; and in Tricot, Y-M. Surfactants: Static and Dynamic Surface Tension. In *Liquid Film Coating*; Kistler, S. F. and Schweizer, P. M., Eds.; Chapman & Hall: London, 1997; p. 99.

Surprisingly, despite the teachings described above, a multilayer coating method has been discovered that allows a user to coat simultaneously two fluids, one on top of the other, onto a substrate, even though the fluid that comprises the lower layer has a surface tension that is less than that of the fluid used to form the upper layer.

The multilayer coating method disclosed herein has numerous advantages over known multilayer coating methods. For one, the method is amenable to coating simultaneously fluids having properties that are very different from each other. The method is also amenable to coating simultaneously fluids having relative properties that fall outside of normally acceptable ranges. This allows a wider range of fluids that can be coated in a single pass operation, thus increasing manufacturing flexibility and reducing costs.

The method disclosed herein is also advantageous in that conventional multilayer coating applicators and apparatuses can be adapted to incorporate the method, i.e, special equipment is not needed. Useful conventional multilayer coating operations include any of those known in the coating and extrusion arts, and in which two or more fluids are coated simultaneously or nearly simultaneously.

The method disclosed herein is advantageous over known methods because it can allow a user to coat at speeds faster than what is typically obtainable for a given set of coating conditions and materials. With known methods, coating speed is often limited because air entrapment occurs at the surface of the substrate between the substrate and the coating fluid. Air entrapment is especially problematic when the substrate surface has any sort of structure, for example, with a microstructured release liner having a microstructured surface. Without wishing to be bound by theory, it is believed that the first coating fluid that directly contacts the substrate, because it has a low surface tension, wets the substrate so that a thin, uniformly thick, layer is formed over the structure with little or no air entrapment. The second coating fluid that forms the bulk pressure sensitive adhesive layer is then able to fill in the structure.

Another advantage is that the method allows one to obtain pressure sensitive adhesive articles with a variety of adhesive properties using one set of coating fluids and, optionally, during the same coating operation. This can be accomplished by varying the thicknesses of the coated layers either individually or in combination. Generally, the first layer can be used to impart properties to the article without affecting bulk properties of the second layer. For example, the first layer can be used to facilitate release of the first and second layers from the substrate, or to permit temporary repositionability. If thin enough, this first layer can have minimal effect on bulk adhesive properties of the second layer such that when applied to an object, the bulk adhesive properties of the second layer allow adhesion between the second layer and the object to build over time.

As a further advantage, the method according to this disclosure can employ coating fluids having reduced amounts of solvent, thus reducing dry time, thereby minimizing drying defects and contamination due to airborne contaminants. The method can be used to manufacture articles exhibiting minimal coating defects or instabilities resulting from imperfect wetting of a coating fluid on a substrate and in the form of ribbing, chatter, streaks, transverse waves, herringbone, bands, barring, bead breaks, weeping, and rivulates that appear as alternating stripes of coated and uncoated areas.

The FIGURE shows a schematic of an exemplary multilayer coating method that may be used to carry out the invention. Multilayer coating applicator 10 comprises upstream bar 12, wedge bar 14, and downstream bar 16, and which are juxtaposed to form cavities such as slots or channels within the applicator. First and second coating fluids, 18 and 20, respectively, are supplied by individual pumps (not shown) to the applicator for application to substrate 22. The second coating fluid flows from the applicator and forms continuous flowing layer 26 in the region between the applicator and the point at which the first and second liquids contact the substrate. The first coating fluid flows from the applicator and onto the continuous flowing layer in the form of first coating layer 24 which may be continuous or discontinuous. The substrate is continuously moved through the coating station, in the direction shown by the arrow, on the peripheral surface of backup roller 28 by a conveyance means (not shown). A composite flowing layer comprises the continuous flowing layer and the first coating layer. The first and second coated layers, 30 and 32, respectively, on substrate 22 comprise multilayer coated article 34.

The multilayer coating applicator shown in the FIGURE is a type of extrusion applicator, particularly referred to as a slotted die applicator or coater with the fluids being fed in a pre-metered fashion through adjustable slots. Slotted die coaters typically have one slot for coating a fluid situated near and about parallel to a second slot for coating a second fluid with the orifaces located near the moving substrate. The flow of each fluid through the respective slots can be controlled with shims. Use of this type of applicator is disclosed, for example, in U.S. Pat. Nos. 5,759,274; 5,639,305; 5,741,549; 6,720,025 B2; and 7,097,673 B2.

Any type of multilayer coating applicator may be used to carry out the multilayer coating method disclosed herein provided it can deliver two different fluids in contact with one another, with at least one layer being provided as a continuously flowing layer, and with the fluids being coatable on a substrate at the same time or nearly the same time. Preferably, the multilayer coating applicator delivers both fluids in a pre-metered fashion. Useful applicators are described, for example, in Cohen, E. and Gutoff, E. *Modern Coating and Drying Technology*; VCH Publishers: New York, 1992; and in *Liquid Film Coating*; Kistler, S. F. and Schweizer, P. M., Eds.; Chapman & Hall: London, 1997. These references also describe useful designs for coating apparatuses that may be employed.

For the multilayer method disclosed herein, a composite flowing layer is formed by flowing a second coating fluid at a rate sufficient to form a continuous flowing layer to a substrate, followed by flowing a first coating fluid onto the continuous flowing layer. The composite flowing layer is then deposited onto the substrate as it passes through a coating station with the first coating fluid interposed between the continuous flowing layer and the substrate. The first coating fluid has a surface tension that is lower than that of the second. The continuous flowing layer is formed into a film after the composite flowing layer contacts the substrate.

The continuous flowing layer is formed by flowing the second coating fluid at some minimum rate or higher that allows the second coating fluid to achieve sufficient velocity and break cleanly from the applicator. The continuous flowing layer is visible as a free jet being expelled from the applicator, usually over a predetermined width depending on the width of the substrate. The minimum rate required to jet the second coating fluid in this manner depends on a variety of factors including fluid properties such as surface tension, viscosity, density, modulus of elasticity, and rheological properties. Other factors include the design of the applicator, for example, dimensions of the slot or channel through which the fluid flows, the angle at which the fluid exits the applicator, the distance between the applicator and the substrate, and the angle of approach of the continuous flowing layer with respect to the substrate. Additional factors to consider are substrate (line) speed and whether or not vacuum is applied.

Typically, a dry coating weight per unit area for the second layer is initially targeted and correlated to a desired wet coating weight per unit area, or desired coating weight per unit area of the layer before any solvent has evaporated. (Dry and wet coating thicknesses may also be used, although densities of dry coatings are typically limited.) Generally, as will be recognized by one of ordinary skill, there is a window of operability that exists, and this window can limit the wet coating weight per unit area that is coatable depending on the particular applicator and the factors described above. This window of operability is used to determine the actual coating weight per unit area for the second coating fluid and the parameters used to set up the coating process. Accordingly, the concentration of components in the second coating fluid can also be varied.

For extrusion type applicators such as the one shown in the FIGURE, the flow rate used to form the continuous flowing layer is typically greater than about 1.5 mL per second per centimeter of jet width. The minimum coating gap is greater than the wet thickness of the second coating layer.

The composite flowing layer is formed by flowing the first coating fluid onto the continuous flowing layer. In this sense, the continuous flowing layer acts as a sort of substrate layer for the first coating fluid. The composite flowing layer must also flow at a rate high enough for it to achieve sufficient velocity as described above. Therefore, the properties of the first coating fluid as well as its coating parameters must also be taken into account when determining the parameters used to coat the second coating fluid.

The first coating fluid can be flowed onto the continuous flowing layer in some continuous or discontinuous fashion, such that it wets the continuous layer to whatever extent is necessary depending on the particular article being manufactured. That is, for articles in which coating uniformity and continuity of the first coating layer are important, it is desirable for the first coating fluid to completely and uniformly wet the continuous flowing layer. For some articles, discontinuities in the first coating layer are tolerable or even desirable, such that some degree of incomplete wetting or dewetting is tolerable or even desirable. Generally, for coating the first coating fluid, a window of operability as described for the second coating fluid also exists.

The substrate is contacted with the composite flowing layer such that the continuous flowing layer and the first coating layer are coated simultaneously or substantially simultaneously. In general, the first coating layer does not contact the substrate unless accompanied by the continuous flowing layer. The continuous flowing layer, however, may or may not contact the substrate depending on whether or not the first coating layer is continuous or discontinuous. The individual fluid layers of the composite flowing layer can impinge on the substrate with little or no mixing such that the distinct properties of the layers are maintained. If this is desired, turbulence in the individual layers should be minimized if the interfacial tensions are low or if the layers are miscible. If there is high interfacial tension, some turbulence may occur without disrupting the interface.

The substrate is moved through the coating station at a speed sufficient to allow an economically productive manufacturing rate and provide a stable coating without instabilities. Preferably, the speed is maintained at a rate that minimizes liquid leakage (such as what can occur at low substrate speed) or air entrainment (such as what can occur at high substrate speed). The speed at which the substrate is moved, also referred to as the coating speed, depends on a variety of factors which define the window of operability as described above.

The first coating fluid comprises a first pressure sensitive adhesive and optional additional components depending on the desired properties of the first layer. For one, the properties of the first layer may be designed so that it functions as a release layer, facilitating separation of the second layer from the substrate with little or no damage to the second layer. The properties of the first layer may also be designed so that an article with a backing adhered to the second layer is temporarily repositionable. In practice, it is extremely difficult to achieve precise positioning of an adhesive article on an object once the two are in contact. Bubbles, wrinkles, etc. are also commonplace when the two are adhered. Attempts to correct any of these problems often results in damage to the article or at least to the adhesive layer. Preferably, the first layer is designed to impart temporary repositionability to the article with little or no change in bulk adhesive properties of the second layer. This may be evidenced by low initial peel adhesion (bond strength) of the article to the object, followed by increasing peel adhesion over time. For example, it may be useful for an article to exhibit an initial peel adhesion that is lower by about 20% or more relative to an article without the first layer. The first layer can also be designed to keep the second layer from sticking to itself once the substrate is removed.

In general, pressure sensitive adhesives are well known to one of ordinary skill in the art to possess properties including the following: (1) permanent tack, (2) adherence to an adherend with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The first pressure sensitive adhesive generally comprises a polymeric and/or oligomeric adhesive prepared by polymerizing one or more monomers. In one example, the first pressure sensitive adhesive may comprise silicone. Examples of silicones include those described in U.S. Pat. No. 5,527,578; U.S. Pat. No. 5,858,545; and WO 00/02966, all incorporated herein by reference. Specific examples include polydiorganosiloxane polyurea copolymers and blends thereof, such as those described in U.S. Pat. No. 6,007,914, incorporated herein by reference, and polysiloxane-polyalkylene block copolymers. Other examples of silicones include silanols, silicone hydrides, siloxanes, epoxides, and (meth)acrylates. The first pressure sensitive adhesive may also comprise a fluorochemical.

In another example, the first pressure sensitive adhesive may comprise a silicone-containing pressure sensitive adhesive. Useful silicone-containing pressure sensitive adhesives include copolymers comprising a vinyl polymeric backbone having polysiloxane moieties grafted thereto as described in U.S. Pat. No. 4,693,935, incorporated herein by reference. The copolymer may comprise: an A monomer comprising at least one free radically polymerizable monomer; a C monomer having the formula: $XY_nSiR_{3-m}Z_m$ wherein: X is a vinyl group polymerizable with the A monomer, Y is a divalent linking group, R is a hydrogen or a lower alkyl, aryl, or alkoxy group, Z is a monovalent siloxane moiety having a $MW_n$ of at least about 500 and is essentially unreactive under copolymerization conditions and is pendant from the vinyl polymeric backbone, n=0 or 1, and m=1, 2, or 3. The copolymer may optionally comprise a B monomer.

The A monomer may comprise at least one free radically polymerizable monomer and may be selected such that a tacky or tackifiable material is obtained upon polymerization of the A monomer, or the A monomer and the B monomer if the latter is used. Examples of A monomers include (meth) acrylic acid esters of non-tertiary alcohols such as methanol, ethanol, 1-propanol, 2-propanol, 1-butanol, 2-methyl-1-propanol, 1-pentanol, 2-pentanol, 3-pentanol, 2-methyl-1-butanol, 1-methyl-1-butanol, 3-methyl-1-butanol, 1-methyl-1-pentanol, 2-methyl-1-pentanol, 3-methyl-1-pentanol, cyclohexanol, 2-ethyl-1-butanol, 3-heptanol, benzyl alcohol, 2-octanol, 6-methyl-1-heptanol, 2-ethyl-1-hexanol, 3,5-dimethyl-1-hexanol, 3,5,5-trimethyl-1-hexanol, 1-decanol, 1-dodecanol, 1-hexadecanol, 1-octadecanol, and the like, the alcohols having from 1 to 18 carbon atoms with the average number of carbon atoms being from 4 to 12, as well as styrene, vinyl esters, vinyl chloride, vinylidene chloride, and the like. Examples of A monomers also include iso-octyl (meth)acrylate, iso-nonyl(meth)acrylate, isodecyl(meth) acrylate, 2-ethylhexyl(meth)acrylate, and ethyl(meth)acrylate. Combinations of any of the A monomers described herein may also be used.

The B monomer may be referred to as a reinforcing monomer and generally includes polar monomers and macromonomers having a $T_g$ or $T_m$ above about 20° C. Examples of polar monomers include (meth)acrylic acid, itaconic acid, (meth) acrylamide, N,N-dimethyl(meth)acrylamide, (meth)acrylonitrile, and N-vinyl pyrrolidone, and examples of macromonomers include poly(styrene), poly(α-methylstyrene), poly(vinyl toluene), and poly(methylmethacrylate).

The C monomer is polymerizable with the A and B monomers and generally has silicone functionality incorporated into its structure. The X group may have the formula:

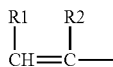

wherein: R1 is hydrogen or a COOH group; R2 is hydrogen, a methyl group, or a —CH$_2$COOH group. The Y group may be any divalent group capable of linking the X group to a silicone atom, for example, the Y group may have any one of the formulas:

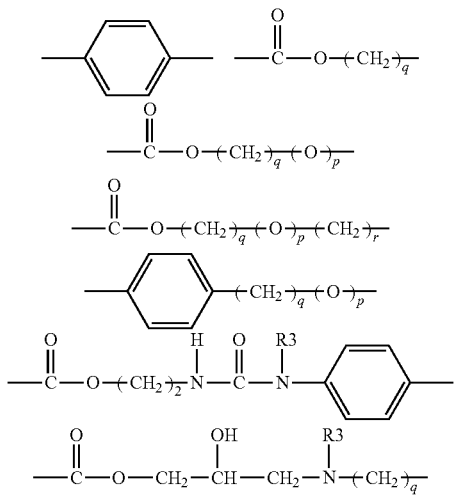

wherein: p=0 or 1; q is an integer from 2 to 6; r is an integer from 2 to 6; and R3 is hydrogen or an alkyl group. The Z group is a monovalent siloxane moiety having a MW$_n$ of at least about 500 and may be further described as having the formula:

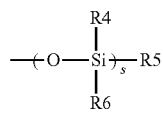

wherein: R4 and R6 are independently lower alkyl, aryl, or fluoralkyl, where lower alkyl and fluoralkyl both refer to alkyl groups having from 1 to 3 carbon atoms and where aryl refers to phenyl or substituted phenyl; R5 may be alkyl, alkoxy, alkylamino, aryl, hydroxyl, or fluoroalkyl; and s is an integer of from about 5 to about 700. Particular examples of C monomers include silicone macromonomers described in U.S. Pat. No. 4,693,935.

The molecular weight and amount of the C monomer should be great enough so that the desired repositionability is obtained, but low enough so that it is compatible during polymerization with the A and optional B monomers. In general, the molecular weight of the C monomer is between about 500 and about 50,000, for example, between about 5000 to about 25,000.

The relative amounts of the A, B and C monomers needed for preparing the silicon-containing pressure sensitive adhesive will depend on the desired properties for the first layer as described above. Accordingly, relative to the total weight of the monomers, the A monomer may range from about 30 wt. % to about 99.99 wt. %, the C monomer from about 0.01 wt. % to about 50 wt. %, and the B and C monomers together from about 0.01 wt. % to about 70 wt. %. Typically, the amount of C monomer will have the most direct effect on lowering the initial peel adhesion and the amount used will depend, at least in part, on its molecular weight.

The amount of the B monomer typically does not exceed about 20 wt. % based on the total weight of all monomers such that excessive firmness of the silicon-containing pressure sensitive adhesive is avoided. For example, if from about 2 to about 15 wt. % of the B monomer is used, the silicon-containing pressure sensitive adhesive is likely to have high cohesive and internal strength while maintaining good adhesive properties.

In a particular example, the first pressure sensitive adhesive comprises a copolymer prepared from polymerizing iso-octyl acrylate, acrylamide, and silicon-containing monomer shown below as SM-1 in a weight ratio of about 91:4:5, respectively.

The A monomer, optional B monomer, and C monomer may be polymerized by conventional free radical polymerization methods as described in U.S. Pat. No. 4,693,935, for example, by solution, suspension, emulsion, or bulk polymerization. For solution polymerization, the monomers are dissolved in an inert organic solvent and polymerized using a suitable free radical initiator which may be thermally or photochemically activated. Polymer grafting techniques are also described in U.S. Pat. No. 4,693,935, each providing a degree of predictability of the properties of the end product. For example, the vinyl polymeric backbone may be formed and then polymerized with a cyclic siloxane monomer. In another example, the vinyl polymeric backbone may be formed and then polymerized with a monofunctional siloxane polymer.

A variety of additional components may be included in the first coating fluid. For example, tackifying resins and plasticizers may be used in order to adjust the tack properties of the first layer. Tackifying resins include rosins and resins of polyterpenes, phenolics, and coumarone-indenes and typically are used in an amount of up to about 150 parts by weight, based on 100 parts by weight of the silicon-containing pressure sensitive adhesive. Plasticizers include aromatic, paraffinic, and naphthenic extender oils, and are typically used in an amount of up to about 50 parts by weight, based on 100 parts by weight of the silicon-containing pressure sensitive adhesive. Pigments, fillers, glass beads, stabilizers, crosslinkers, etc. may also be added.

As described above, the surface tension of the first coating fluid is less than that of the second. A lower surface tension may be achieved by the presence of the first pressure sensitive adhesive, i.e., without any additional components necessary for lowering the surface tension. For example, if the first pressure sensitive adhesive comprises silicone or is a silicon-containing pressure sensitive adhesive and the second pressure sensitive adhesive is not either of these, then the first coating fluid will likely have a lower surface tension than the first. It is also possible that additional components such as surfactants may be used to lower the surface tension. It is also possible to employ solvents that give the first coating fluid a lower surface tension than the first. The difference in surface tensions between the first and second fluids is not particularly limited as long as the desired degree of wetting of the continuous flowing layer occurs. In one example, difference in surface tensions is about 1 dyne/cm.

As described above the first coating fluid is flowed onto the continuous flowing layer formed by the second coating fluid. This first coating fluid forms a first layer. In general, the first layer should be thick enough to impart the desired properties to the resulting article, for example, to form a continuous first layer, if desirable. The first layer should also be thin enough so that the properties of the second layer or film formed therefrom are not adversely affected. The thickness of the first layer is typically less than about 25 um. If the first coating fluid comprises solvent, then the thickness of the first layer may be less than the coated thickness, if solvent migrates from the first layer and into the second layer or film formed therefrom and/or into the substrate. The thickness of the first layer may also be less than about 10 um, less than about 5 um, or less than about 0.5 um.

The second coating fluid comprises a second pressure sensitive adhesive and optional additional components depending on the desired properties of the film formed therefrom. Forming a film from the second coating fluid may comprise evaporation of solvent from the second coating fluid after it is coated, or it may comprise cooling if the second coating fluid comprises some kind of hot melt pressure sensitive adhesive. Forming a film from the second coating fluid may also comprise curing components in the fluid, such as by applying thermal or UV radiation to initiate reaction between a crosslinking agent and a polymer or oligomer component. A combination of any of these may also be used.

The properties of the film, or second layer, may be designed so that it builds to a minimum peel adhesion with a particular kind of object. For example, an application may require that the second layer not be removable from an object after a period of time, or at least only removable under severe conditions such as high heat or solvent that dissolves the layer. Such an article may comprise a paint replacement film for automobiles. Alternatively, an application may require that the two be removable after some short period of time such as for a paint masking tape on a window, or for a longer period of time such as for a protective film for a display device.

Useful second pressure sensitive adhesives include materials having the properties described above for the first pressure sensitive adhesive. Examples include copolymers comprising from about 30 wt. % to about 99.99 wt. % A monomer and from about 0.01 wt. % to about 70 wt. % B monomer. For example, the second pressure sensitive adhesive may comprise from about 90 to about 99.99 wt. % of iso-octyl acrylate, 2-ethylhexyl acrylate, n-butyl acrylate, 2-methylbutyl acrylate, or a combination thereof, and from about 0.01 to about 10 wt. % (meth)acrylamide or (meth)acrylic acid. The second pressure sensitive adhesive may also be crosslinkable. A variety of additional components may be included in the second coating fluid as described above for the first coating fluid.

The substrate may comprise any suitable carrier web and may be flexible. Examples include paper such as clay-coated paper or polyethylene-coated paper. Examples also include polymeric films comprising one or more polymers such as cellulose acetate butyrate; cellulose acetate propionate; cellulose triacetate; poly(meth)acrylates such as polymethyl methacrylate; polyesters such as polyethylene terephthalate, polyethylene naphthalate, and copolymers or blends based on naphthalene dicarboxylic acids; polyether sulfones; polyurethanes; polycarbonates; polyvinyl chloride; syndiotactic polystyrene; cyclic olefin copolymers; and polyolefins including polyethylene and polypropylene such as cast and biaxially oriented polypropylene. The substrate may comprise single or multiple layers, such as polyethylene-coated polyethylene terephthalate. The substrate may be primed or treated to impart some desired property to one or more of its surfaces. Examples of such treatments include corona, flame, plasma and chemical treatments.

The substrate may comprise a release liner which may be any transfer liner known to those skilled in the art and that is capable of being placed in intimate contact with the first and/or second layers and subsequently removed without affecting performance of the layers. The release liner can be any of the aforementioned papers or polymeric films, either of which can be coated with a release coating.

The surface of the substrate onto which the composite flowing layer is coated may be substantially flat, or it may have some type of a textured or structured surface. When substrates having textured or structured surfaces are used, they are typically release liners. The textured or structured surface imparts a shape to the first and second layers. Textured surfaces include those having random roughness, random patterns of shapes, ordered roughness, ordered patterns of shapes, or combinations thereof. Structured surfaces include microstructured surfaces such as those provided by microstructured release liners. Microstructured surfaces generally comprise a microstructure having at least two lateral dimensions (i.e. dimensions in the plane of the film) less than 1.4 mm (55 mils), made as described, for example, in U.S. Pat. No. 6,197,397; U.S. Pat. No. 6,123,890; U.S. Pat. No. 6,838,142 B2; and U.S. Pat. No. 6,838,150 B2; which are incorporated herein by reference. The microstructured surface may comprise, for example, a series of shapes including ridges, posts, pyramids, hemispheres and cones, and/or they may be protrusions or depressions having flat, pointed, truncated, or rounded parts, any of which may have angled or perpendicular sides relative to the plane of the surface. The microstructured surface may have a pattern, be random, or a combination thereof. The microstructured surface may impart substantially continuous open pathways or grooves into the first and/or second layers.

As described above, the method disclosed herein can be used to prepare articles such as the multilayer coated article 34 shown in the FIGURE and comprising a substrate; a first layer adjacent the substrate, the first layer comprising a first pressure sensitive adhesive and having a thickness of less than 25 um, a second layer adjacent the first layer and opposite the substrate, the second layer comprising a second pressure sensitive adhesive.

After the layers are sufficiently dried, cured, etc., a backing may be applied to the second layer opposite the first layer. The backing may comprise paper or a polymeric film such as polyvinyl chloride. The backing and second layer have a much higher peel adhesion that the first and/or second layers to the substrate. Contacting a backing to the second layer may comprise laminating the backing to the second layer. When the release liner is removed, the resulting adhesive article comprises: a backing; a second layer adjacent the backing, the second layer comprising a second pressure sensitive adhesive; and a first layer adjacent the second layer and opposite the backing, the first layer comprising a first pressure sensitive adhesive and having a thickness of less than 25 um.

The adhesive article may be used in a variety of applications. For example, it may be a tape or a label. The backing may be imaged using a variety of commercial techniques such that the adhesive article may be used as a graphic art film such as a sign. The exposed surface of the backing (opposite the second layer) may be hard enough so that the adhesive article can be used for protecting an object such as an automobile part or an optical display. One or more of the backing, second layer, or first layer may be opaque and/or colored so that the adhesive article can be used as a paint replacement film or a window film to provide decoration and/or privacy. In addition, one or more of the backing, second layer, or first layer may comprise absorbing and/or reflecting components so that the adhesive article can be used as a window film that reflects light and or heat.

The invention is further described by the examples below.

EXAMPLES

First Coating Fluid 1 (FCF-1)

FCF-1 contained an adhesive derived from iso-octyl acrylate, acrylamide, and Silicone Macromer-1 (SM-1) in a 91:4:5 ratio by weight and prepared as described for Examples 2-4 of U.S. Pat. No. 4,693,935. SM-1 had a molecular weight of about 11,000 g/mol and was prepared as described for Monomer "C 3b" of U.S. Pat. No. 4,693,935. FCF-1 contained the adhesive at 5 wt. % in a mixture of ethyl acetate, heptane, methanol, and isopropyl alcohol.

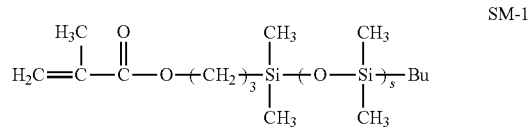

Comparative First Coating Fluid (Comp. FCF)

Comp. FCF contained an adhesive derived from iso-octyl acrylate and acrylic acid in a 93/7 ratio by weight and prepared as described for Example 26 of U.S. Pat. No. 4,693,935. Comp. FCF had a surface tension of 23.7 dyn/cm, a density of 0.880 g/cc, and a viscosity of 20 cP.

Second Coating Fluid 1 (SCF-1)

SCF-1 consisted of iso-octyl acrylate and acrylic acid in a 90/10 ratio by weight and prepared as described for Example 26 of U.S. Pat. No. 4,693,935. SCF-1 contained the adhesive at 14 wt. % in MEK and the bisamide crosslinker described above at 1.5 wt. %. SCF-1 had a surface tension of 26.2 dyn/cm, a density of 0.900 g/cc, and a viscosity of 700 cP.

Preparation of Adhesive Articles

Comparatives 1-3 (C1-C3) were prepared by simultaneously coating the Comp. FCF and SCF-1 as the first and second layers, respectively, onto a microstructured liner 3M Scotchcal™ High Performance Film, Automotive Grade with Comply™ Adhesive Performance, having a square-based flat top pyramid 10 um tall and nominal 200 um pitch. Examples 1-3 were prepared by simultaneously coating FCF-1 and SCF-1 as the first and second layers, respectively, onto the same microstructured liner. A dual slot coater equipped with a die as described in FIG. 2b of U.S. Pat. No. 7,097,673 B2 was used. The position of the die was adjusted relative to the release liner such that the minimum gap was at least the wet thickness of the second layer as shown in Table 1, and as long as a continuous uniform layer of the second coating fluid on the release liner was obtained. Layer thicknesses and flow rates for the pumps are shown in Table 1. The release liner was moved at a rate of 7.6 m/min. through a curing/drying station having five temperature zones of 49, 66, 66, 74, and 82° C. over a length of about 12.2 m. The cured/dried coatings were then passed through a laminating station in which a 51 um (2 mil) PET backing was laminated to the dry second layer.

TABLE 1

| | | | | Thickness (um) | | | |
|---|---|---|---|---|---|---|---|
| Ex. | FCF | Flow Rate FCF (g/min) | Flow Rate SCF-1 (g/min) | Wet First Layer | Wet Sec. Layer | Dry First Layer | Dry Sec. Layer |
| C1 | none | 0 | 80 | 0 | 271 | 0 | 38 |
| C2 | Comp. (23.7)* | 7 | 80 | 10 | 71 | 0.5 | 10 |
| C3 | Comp. | 22 | 80 | 32 | 71 | 1.6 | 10 |
| C4 | Comp. | 36 | 80 | 52 | 71 | 2.6 | 10 |
| 1 | FLC-1 (22.7)* | 7 | 80 | 10 | 71 | 0.5 | 10 |
| 2 | FLC-1 | 22 | 80 | 32 | 71 | 1.6 | 10 |
| 3 | FLC-1 | 36 | 80 | 52 | 71 | 2.6 | 10 |

*surface tensions in dyn/cm are shown in parentheses

Evaluation of Peel Adhesion

Peel adhesion (180°) was tested as follows. For each adhesive article, a strip (2.5 cm by 20 cm) was cut, and the PET release liner removed to expose the first layer. The resulting article was then laminated to window glass using a 1.7 kg (4.5 lb.) rubber roller, after the glass had been cleaned with isopropanol and Kimwipes® (Kimberly Clark). The roller was positioned at one end, and slowly rolled down and back in about 3 seconds without any additional pressure. The resulting laminate was visually inspected in order to ensure that 100% wet-out had been obtained (no gross bubble could be seen with the naked eye).

The 180° peel adhesion was tested using a 3M90 slip/peel tester (from IMASS), with conditions 229 cm/min (90 inch/min), 2 second delay, and 5 second data acquisition. Peel adhesion was measured at an initial time and after the following time intervals: 5 min., 1 hour, 24 hour, and 48 hours. Samples of the laminates were stored flat between measurements. Three tests were performed for each laminate, and average values are reported in Table 2.

TABLE 2

| | Thickness Ratio | Avg. Peel Adhesion (N/dm) | | | |
|---|---|---|---|---|---|
| Ex. | (Second/First) | Initial | 5 min. | 1 hr. | 24 hr. |
| C3 | — | 47 | NM | NM | 61 |
| C4 | 20 | 46 | 54 | 93 | 93 |
| C5 | 6 | 61 | 76 | 71 | 78 |
| C6 | 4 | 70 | 62 | 77 | 76 |
| 8 | 20 | 49 | 56 | 62 | 82 |
| 9 | 6 | 37 | 54 | 66 | 71 |
| 10 | 4 | 33 | 50 | 58 | 73 |

Various modifications and alterations of the invention will become apparent to those skilled in the art without departing from the spirit and scope of the invention.

What is claimed is:

1. A multilayer coating method comprising:
   providing a first coating fluid;
   providing a second coating fluid, the second coating fluid having a surface tension that is greater than that of the first;
   moving a substrate along a path through a coating station;
   flowing the second coating fluid at a rate sufficient to form a continuous flowing layer towards the substrate;

flowing the first coating fluid onto the continuous flowing layer thereby forming a composite flowing layer;

subsequently contacting the substrate with the composite flowing layer such that the first coating fluid is interposed between the continuous flowing layer and the substrate; and forming the composite flowing layer into a film after the composite flowing layer contacts the substrate, the film comprising a first coating layer formed from the first coating fluid and a second coating layer formed from the second coating fluid, wherein the first coating layer comprises a continuous or a discontinuous layer.

2. The multilayer coating method of claim 1, wherein the second coating fluid comprises a pressure sensitive adhesive.

3. The multilayer coating method of claim 1, wherein the first coating fluid comprises silicone.

4. The multilayer coating method of claim 1, wherein the first coating fluid comprises a silicone-containing pressure sensitive adhesive, the silicone-containing pressure sensitive adhesive comprising a copolymer, the copolymer comprising a vinyl polymeric backbone having polysiloxane moieties grafted thereto.

5. The multilayer coating method of claim 4, the copolymer comprising: an A monomer comprising at least one free radically polymerizable monomer; and a C monomer having the formula:

$XY_nSiR_{3-m}Z_m$ wherein:
X is a vinyl group polymerizable with the A monomer,
Y is a divalent linking group,
R is a hydrogen or a lower alkyl, aryl, or alkoxy group,
Z is a monovalent siloxane moiety having a $MW_n$ of at least about 500 and is essentially unreactive under copolymerization conditions and is pendant from the vinyl polymeric backbone,
n=0 or 1, and
m=1, 2, or 3.

6. The multilayer coating method of claim 1, wherein the first coating layer has a thickness of less than about 25 micrometers.

7. The multilayer coating method of claim 1, wherein the first coating layer has a thickness of less than about 5 micrometers.

8. The multilayer coating method of claim 1, wherein the first coating layer has a thickness of less than about 0.5 micrometers.

9. The multilayer coating method of claim 1, the substrate comprising a release liner.

10. The multilayer coating method of claim 1, the substrate comprising a microstructured release liner having a microstructured surface that is contacted with the composite flowing layer.

11. The multilayer coating method of claim 1, wherein the first coating layer is continuous.

* * * * *